US006935746B2

(12) United States Patent
Bierhuizen

(10) Patent No.: US 6,935,746 B2
(45) Date of Patent: Aug. 30, 2005

(54) METHOD AND APPARATUS FOR REDUCING SCATTERED LIGHT IN A PROJECTION SYSTEM

(75) Inventor: Serge J. A. Bierhuizen, Santa Rosa, CA (US)

(73) Assignee: InFocus Corporation, Wilsonville, OR (US)

( * ) Notice: Subject to any disclaimer, the term of this patent is extended or adjusted under 35 U.S.C. 154(b) by 25 days.

(21) Appl. No.: 10/417,245

(22) Filed: Apr. 15, 2003

(65) Prior Publication Data

US 2004/0207814 A1 Oct. 21, 2004

(51) Int. Cl.[7] .................. G03B 21/00; G03B 21/14; G03B 21/28; G02F 1/1335; G02B 27/28
(52) U.S. Cl. .................... 353/20; 353/31; 353/33; 353/81; 349/9; 359/497; 359/834
(58) Field of Search .............. 353/20, 31, 33, 353/81; 349/9; 359/497, 834, 494, 495, 496

(56) References Cited

U.S. PATENT DOCUMENTS

| | | | | |
|---|---|---|---|---|
| 4,859,055 A | * | 8/1989 | Gal et al. ................ 356/28 |
| 5,623,349 A | | 4/1997 | Clarke ..................... 349/8 |
| 5,777,789 A | * | 7/1998 | Chiu et al. ............... 359/494 |
| 5,864,374 A | * | 1/1999 | Ito et al. .................. 348/757 |
| 5,993,008 A | | 11/1999 | Hashimukai et al. ...... 353/61 |
| 6,327,093 B1 | | 12/2001 | Nakanishi et al. ......... 359/634 |
| 6,331,878 B1 | * | 12/2001 | Takahara .................. 349/5 |
| 6,511,183 B2 | * | 1/2003 | Shimizu et al. ........... 353/20 |
| 6,582,080 B2 | | 6/2003 | Gibbon et al. ............ 353/20 |
| 6,698,896 B2 | * | 3/2004 | Suzuki et al. ............. 353/33 |
| 2002/0097382 A1 | | 7/2002 | Suzuki et al. ............. 353/131 |
| 2002/0109820 A1 | | 8/2002 | Pan ......................... 353/20 |
| 2002/0135540 A1 | | 9/2002 | Yoneyama et al. ....... 345/20 |
| 2003/0025880 A1 | | 2/2003 | Newell et al. ............ 353/20 |
| 2003/0071973 A1 | * | 4/2003 | Hansen et al. ............ 353/20 |
| 2003/0081179 A1 | * | 5/2003 | Pentico et al. ............ 353/20 |

FOREIGN PATENT DOCUMENTS

WO   WO 00/63738   10/2000 ........... G02B/27/28

OTHER PUBLICATIONS

Robinson et al., "High Contrast Color Splitting Architecture Using Color Polarization Filters", SID 00 Digest, p. 92–95.*
Merriam–Webster's Collegiate Dictionary, Tenth Edition, copyright 2001, p. 116.*

* cited by examiner

Primary Examiner—Judy Nguyen
Assistant Examiner—Melissa J Koval
(74) Attorney, Agent, or Firm—Schwabe, Williamson & Wyatt, P.C.

(57) ABSTRACT

The invention includes a color projection system comprising having a light source optically coupled to a light management device. The light management device being optically coupled to a polarizer. The color projection system also includes a projection lens optically coupled to the polarizer. Additionally, a plate is disposed between the polarizer and the projection lens. The plate has quarter-wave properties. The light management device has a number of polarizing beamsplitter (PBS) cubes, with one or more subsets of which are optically coupled to each other, and at least one light blocking region disposed between a first and a second PBS cube of the number of PBS cubes. As result reduction of stray light in a reflective projection system is facilitated.

32 Claims, 3 Drawing Sheets

METHOD AND APPARATUS FOR REDUCING SCATTERED LIGHT IN A PROJECTION SYSTEM

FIELD OF INVENTION

The present invention relates to the field of color projection system. In particular, the present invention facilitates reduction of stray light in a reflective color projection system.

BACKGROUND OF THE INVENTION

Projection technology utilizes several technologies for projecting images at high resolution. Projection technologies may be categorized into two broad categories. One category may be transmittive projection system that includes technologies utilizing cathode ray tubes (CRTs) or liquid crystal displays (LCDs). Another category may be reflective projection system that includes technologies utilizing microelectromechanical systems (MEMS), such as digital micromirror devices (DMD™) or digital light processing (DLP). More recently, reflective projection systems include liquid crystal on silicon (LCOS) technology. Commonly, some of the issues associated with these projection systems are issues such as resolution, cost, manufacturability, and size, to name a few.

In transmittive projection systems, the advent of thin film transistors (TFTs) has improved the technology in particular, transmittive projection technology associated with LCDs. However, as the LCDs are reduced in size, the TFTs may start to interfere with the transmission of light through the LCDs because as the LCDs are reduced in size, the TFTs occupy relatively more space (i.e., the aperture ratio decreases as the resolution increases).

Reflective projection systems do not have the concern of light interfering with TFTs because light is reflected rather than transmitted through the LCD. However, utilization of MEMS technology can be costly because of the technical requirements associated with such small mechanical devices that may range in size of 16 square micrometers (i.e., manufacturing and controlling such small mechanical objects). In reflective projection systems, a technology utilized to address some of the issues associated with MEMS technology is the liquid crystal on silicon (LCOS) technology. The LCOS technology integrates liquid crystal technology and a metal oxide semiconductor (MOS) to result in a reflective projection system that offers high resolution, low cost, scalable to small sizes, and relatively easy to manufacture.

An aspect of utilizing LCOS projection systems involves management of light within the projection system. For example, the management of light may involve processes such separating light into its various color components, polarizing, and recombining the various color components to form an appropriate image. An example of light management device, which may be referred to as an architecture, suitable for the LCOS projection system may be a ColorQuad™ architecture utilizing ColorSelect™ polarization filter technology by Colorlink, Inc. of Boulder, Colo.

The ColorQuad™ architecture selectively rotates the polarization of one color relative to its complement. Utilizing the ColorSelect™ polarization filter technology, including polarizing beamsplitter (PBS) cubes, the ColorQuad™ architecture facilitates high contrast displays by providing polarization integrity of color separation and recombination.

Because light commonly used in a projection system is non-coherent light (i.e., white light), management of light may be difficult due to many factors. One factor, in particular, is straying of light.

For example, the PBS cubes used to manage light in an LCOS projection system can be arranged in a very compact manner by having PBS cubes of various sizes cemented together. To properly manage the light in the PBS cubes, various lenses, filters, and reflective coatings are utilized. However, the non-coherent nature of light combined with the compact arrangement of the PBS cubes, can result in stray light contaminating the projected image.

Even though, the LCOS technology offers high resolution, low cost, scalable to small sizes, etc., the non-coherent nature of the light used and the compact arrangement of the PBS cubes within the reflective projection system, can result in stray light contaminating the projected image, thereby decreasing contrast and introducing image homogeneity issues.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

The invention facilitates reduction of stray light in a reflective projection system. In the following description, various aspects of the invention will be described. However, one skilled in the relevant art will recognize that the invention may be practiced without one or more of the specific details, or with other methods, materials, components, etc. In other instances, well-known structures, materials, or operations are not shown or described in detail to avoid obscuring aspects of various embodiments of the invention. Similarly, for purposes of explanation, specific numbers, materials and configurations are set forth in order to provide a thorough understanding of the invention. Nevertheless, the invention may be practiced without the specific details. In other instances, well-known features are omitted or simplified in order not to obscure the invention. Furthermore, it is understood that the various embodiments shown in the figures are illustrative representations and are not necessarily drawn to scale.

The terms "comprising", "including", "having", and other terms of the like, as used in the application (in particular, the claims), are synonymous.

Reference throughout this specification to "one embodiment" or "an embodiment" means that a particular feature, structure, material, or characteristic described in connection with the embodiment is included in at least one embodiment of the invention. Thus, the appearances of the phrases "in one embodiment" or "in an embodiment" in various places throughout this specification are not necessarily all referring to the same embodiment or invention. Furthermore, the particular features, structures, materials, or characteristics may be combined in any suitable manner in one or more embodiments.

For the purposes of describing the invention, light will be illustrated as straight lines. However, one skilled in the relevant art will appreciate that light may behave as waves or particles. Additionally, certain established principles of physics will not be described in detail, in particular, derivations of equations such as those describing the behavior of light will not be described in detail. However, relevant equations will be described but not derived. It should be appreciated by those skilled in the relevant art that light may be focused through one or more lenses; however, because of the nature of light, stray light is readily present in projection systems, particularly when reflections occur.

Accordingly, the concept of filtering and polarizing light will not be described in detail. However, for the purposes of the invention, the concept of reflecting light will be referred to in describing the invention.

Figure 1:
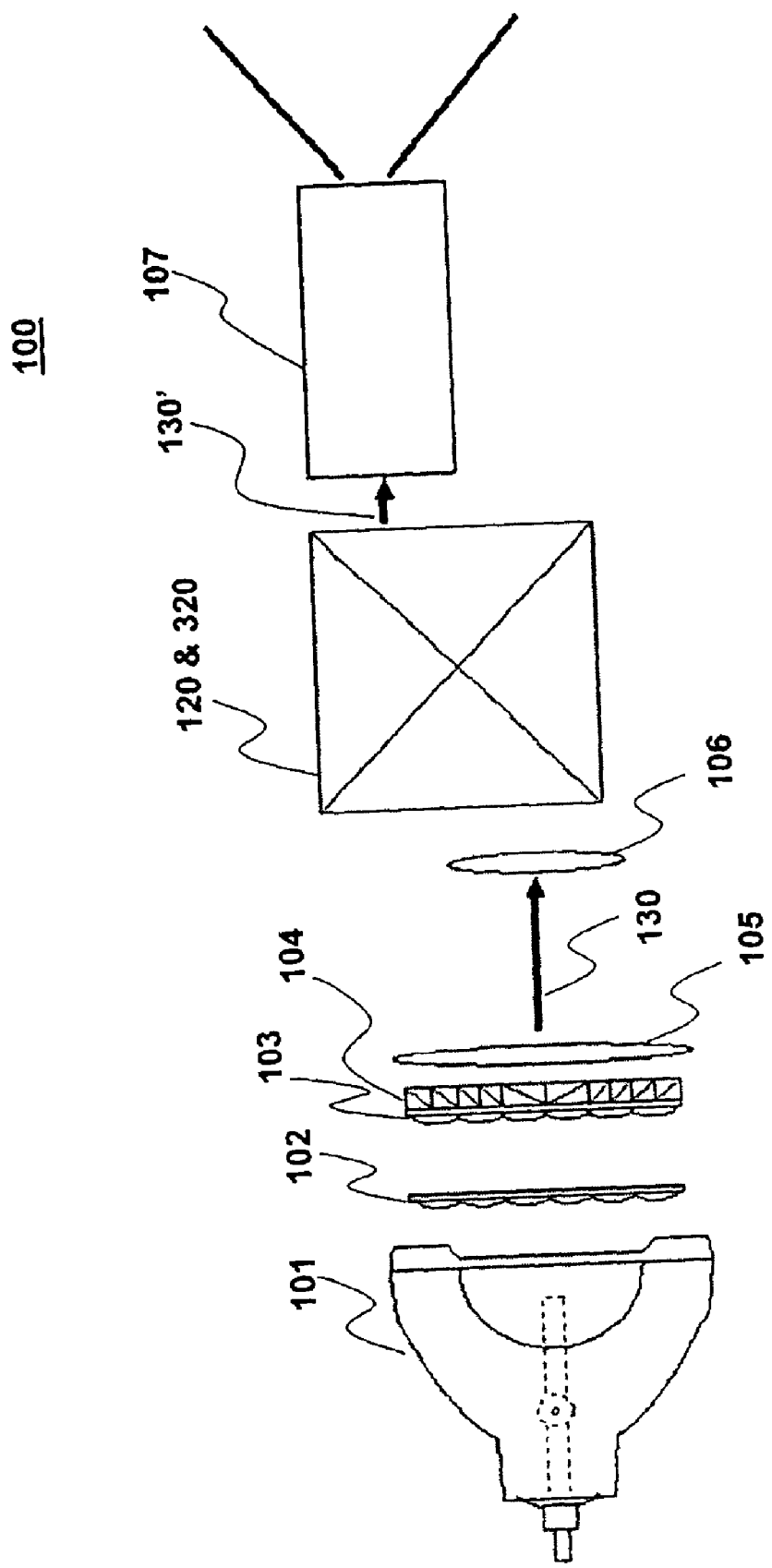
FIG. 1 illustrates diagrammatically an example of a color projection system comprising optical components with which embodiments of the invention may be practiced.

FIG. 1 illustrates diagrammatically an example of a color projection system comprising optical components with which embodiments of the invention may be practiced. Illustrated in FIG. 1, color projection system 100 can be a reflective color-projection system, such as, but not limited to, a liquid crystal on silicon (LCOS) projection system. Color projection system 100 includes a light source 101. A first integrator plate 102 is disposed in the optical path between light source 101 and a second integrator plate 103. A polarization conversion system (PCS) 104 is disposed in the optical path between the second integrator plate 103 and a first relay lens 105. A second relay lens 106 is disposed in the optical path between first relay lens 105 and a light management device 120. A projection lens 107 is disposed at the other or opposite side of the light management device 120 to project an image. It should be appreciated by those skilled in the relevant art that light management device 120 may be referred to as a color management architecture; however, for the purpose of describing the invention, the light management device 120 will be referred to as light management device.

Except for the teachings of the invention incorporated in the light management device 120, optical components 101–107 and their functions are known. For example, in color projection system 100 illustrated in FIG. 1, light source 101 may be an arc lamp, such as but not limited to, a metal halide arc lamp, producing white light 130. First integrator plate 102 may be any type to facilitate creation of multiple images of white light 130 at the second integrator plate 103. PCS 104 is disposed in the optical path between second integrator plate 103 and first relay lens 105 to facilitate conversion of light into polarized light. Relay lenses 105 & 106 focus white light 130 before white light 130 is processed in the light management device 120 to become processed light 130' for image projection. Processed light 130' is received by the projection lens 107 to project an image (not shown).

Light management device 120, incorporating embodiments of the invention, facilitates reduction of stray light in color projection system 100.

Figure 2:
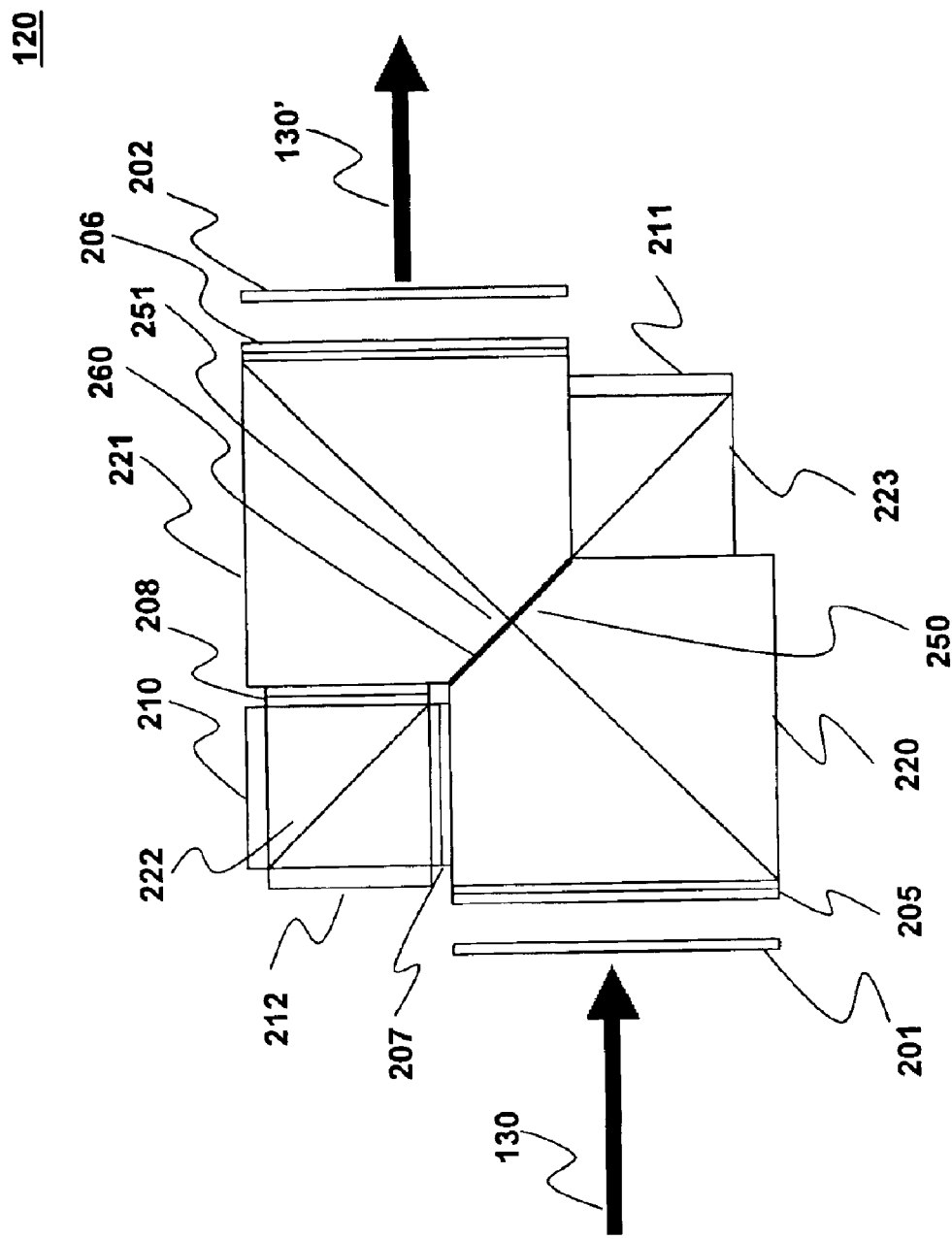
FIG. 2 illustrates a top view of an exemplary light management device to facilitate reduction of stray light, in accordance with one embodiment of the invention.

FIG. 2 illustrates a top view of an exemplary light management device to facilitate reduction of stray light, in accordance with one embodiment of the invention. In order to describe the invention, an overview of the various light management components of a light management device, and their arrangements will be briefly described. Illustrated in FIG. 2, light management device 120 includes various light management components. Light management components can include a first and second polarizers 201–202, a first and second set of magenta and green (MG) filters 205–206, a first and second set of red and blue (RB) filters 207–208, a red liquid crystal on silicon (LCOS) display 210, a green LCOS display 211, and a blue LCOS display 212. Additionally, illustrated in FIG. 2, light management device 120 includes light management components to reflect light within the light management device 120, in particular, four polarizing beamsplitter (PBS) cubes 220–223 are optically coupled in a predetermined manner to facilitate reflection and transmission of light within light management device 120 to and from other various light management components 201–202, 205–208, and 210–212. The four PBS cubes 220–223 are referred to as cubes for ease of understanding the invention; however, the four PBS cubes 220–223 may be cube like. Alternatively, wire grid polarizers may be utilized.

As illustrated in FIG. 2, the predetermined manner in which light management components, polarizers 201–202, MG and RB filters 205–208, LCOS displays 210–212, and PBS cubes 220–223, are optically coupled, is a compact square shape (i.e., compact cubic shape). The compact square shape can be similar to light management device referred to as ColorQuad™ architecture from ColorLink, Inc. of Boulder, Colo. However, in FIG. 2, the four PBS cubes 220–223 may vary in size and shape. Even though, the first and second PBS cubes 220–221 may have identical size and the third and fourth PBS cubes 222–223 may have identical size and shape, the first and second PBS cubes 220–221 are larger than third and the fourth PBS cubes 222–223, and each of the first and second PBS cubes 220–221 have oblique sides 250–251. The first and second PBS cubes 220–221 are optically coupled at the oblique sides 250–251.

Oblique sides 250–251 may facilitate adjustments in incident flux densities within the PBS cubes because transmittance is controlled by frustrating total internal reflection (FTIR) at the hypotenuse. Accordingly, based at least upon depth of oblique sides 250–251 (i.e., length of the hypotenuse), incident densities within PBS cubes 220–223 may be varied. Furthermore, oblique sides 250–251 aid in reducing the overall size of light management device 120, thereby increasing its compactness. As will be described in further detail below, stray light passing through the oblique sides 250–251 may have angles acceptable by projection lens 107, thereby contaminating the projected image and introducing contrast and image homogeneity issues.

As illustrated in FIG. 2, a light blocking region is disposed between oblique sides 250–251, in accordance with one embodiment of the invention. The light blocking region may be facilitated by an opaque coating 260. The opaque coating 260 may be any type of opaque coating to prevent light from passing through the oblique sides 250–251, such as, but not limited to, light absorbing thin film or the PBS cubes may include doping that affects the optical properties thereof. The light absorbing thin film may be any type such as, but not limited to, opaque layer of silver, 70 nanometers in thickness. Furthermore, in addition to the opaque coating 260 between the oblique sides 250–251, multiple light blocking regions may be disposed to predetermined sides of other light management components, such as, but not limited to, edges of filters 205–208 to further contain stray light.

In one embodiment, the first polarizer 201 may be a polarizer that does not absorb polarized light, such as, a wire-grid polarizer (not shown). Unlike common polarizers, which may be a polycarbonate type, a wire-grid polarizer can withstand higher temperatures and commonly do not absorb light. However, during a black state of the color projection system 100, where the light is reflected back towards the light source 101, the wire-grid polarizer may reflect some of the light back into the light management device 120. Accordingly, the wire-grid polarizer may be angled in a predetermined angle to reflect light directed towards the light source 101 back towards the opaque coating 260.

As a result, stray light can be advantageously prevented from being accepted by a projection lens from a light management device, thereby reducing contamination of the projected image and reducing contrast and image homogeneity issues.

In yet another embodiment, the second polarizer 202 may be a polarizer in combination with a plate having quarter-wave properties (not shown). For example, optically coupled to the second polarizer 202, between the second polarizer 202 and the projection lens 107 (shown in FIG. 1), may be a plate made of BK7 glass having a quarter-wave magnesium fluoride ($MgF_2$) coating on its surfaces. The addition of a plate having quarter-waver properties facilitates conditioning of light from the second polarizer 202, which may be light having a linear polarization, into light having a circular polarization. Accordingly, light that may be reflected back towards the light management device 120 & 320 from the projection lens 107 would pass through the plate having quarter-waver properties a second time resulting in light having an orthogonal polarization state. Because this light may have an orthogonal polarization state, the light that may be reflected back towards the light management device 120 & 320 from the projection lens 107 may be absorbed by the second polarizer 202. A light management device associated with this embodiment, may be a light management device shown in FIGS. 2 & 3, and alternatively, the light management device may also be a light management device having a single PBS and one more displays (not shown), in accordance with an embodiment of the present invention.

As a result, light can be advantageously prevented from being accepted from a projection lens, thereby reducing undesirable images such as, but not limited to, ghost images.

Figure 3:
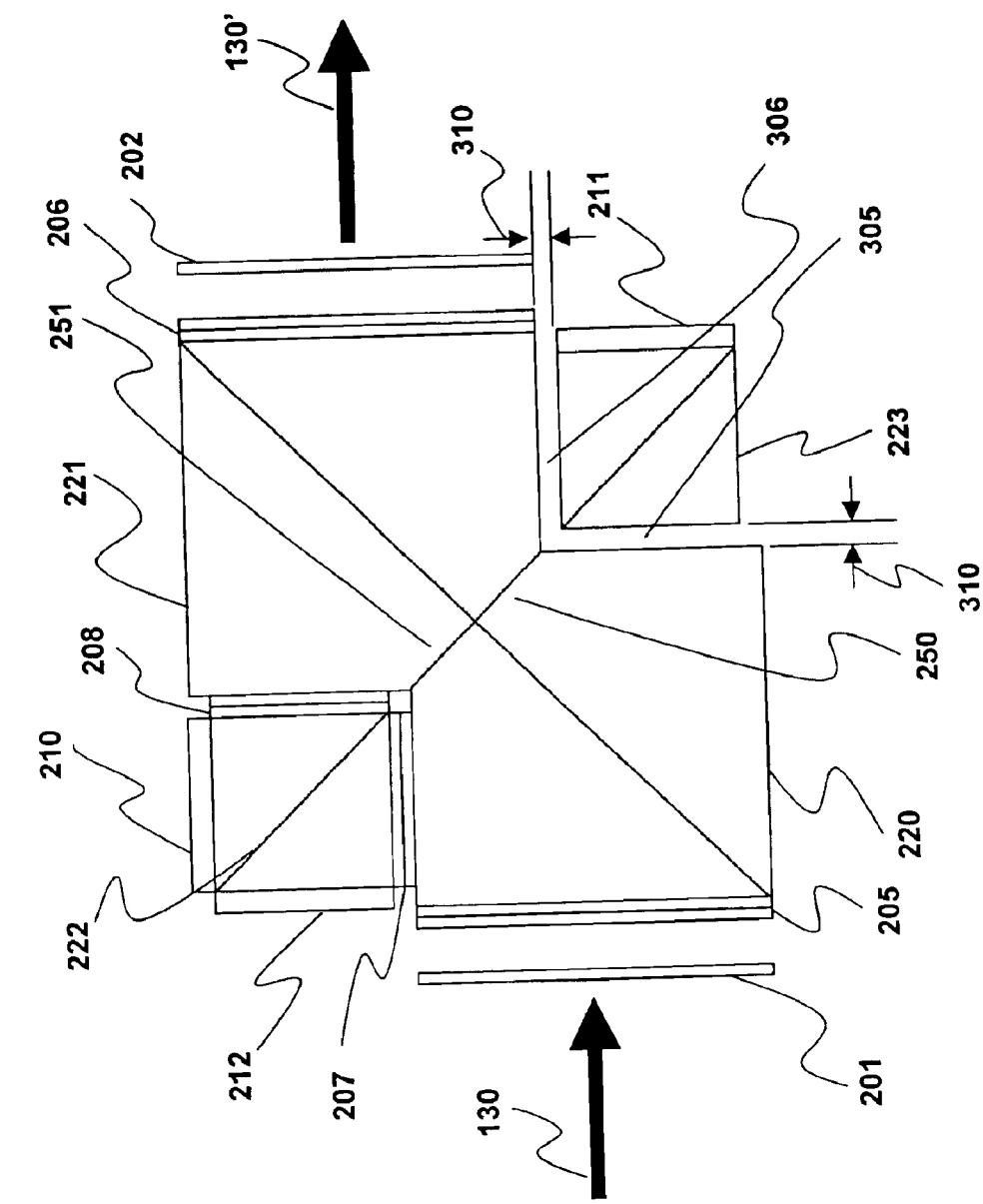
FIG. 3 illustrates a top view of a light management device to facilitate reduction of stray light, in accordance with an alternate embodiment of the invention.

FIG. 3 illustrates a top view of a light management device to facilitate reduction of stray light, in accordance with an alternate embodiment of the invention. Illustrated in FIG. 3, alternate light management device 320 includes light management components and has an optical coupling arrangement similar to the light management device 120 illustrated in FIG. 2. However, alternate light management device 320 has the fourth PBS cube 223 optically coupled at a predetermined distance 310 from the other PBS cubes 220–222, thereby exposing a first coupling area 305 and a second coupling area 306. Fourth PBS cube 223 is optically coupled to the first PBS cube 220 via first coupling area 305 and to second PBS cube 221 via second coupling area 306.

In one embodiment illustrated in FIG. 3, predetermined distance 310 separating the fourth PBS cube 223 from the other PBS cubes 220–222 facilitates containment of stray light, thereby reducing stray light from reaching the projection lens 107. The predetermined distance 310 may be of a distance enough to provide a thin air gap between the fourth PBS cube 223 and first and second PBS cubes 220–221, such as, but not limited to, 1 millimeter.

Based at least upon principles of total internal reflection (TIR), light traveling in a direction perpendicular to the first coupling area 305 will travel from the first PBS cube 220 to the fourth PBS cube 223. Furthermore, light traveling in a direction perpendicular to the second coupling area 305 will travel from the fourth PBS cube 223 to the second PBS cube 221. However, in accordance with the principles of TIR, light traveling in directions that incident onto the coupling areas 305–306 at certain angles, may not travel from one PBS cube to another.

For example, PBS cubes are commonly made of glass, such as, but not limited to BK7 glass. As light travels from the first PBS cube 220 to the first coupling area 305, if the light incident on the first coupling area 305 is at an angle (relative to the refractive index) less than a critical angle, the light would not be refracted, but instead, the light is reflected. The critical angle may be determined in accordance with Snell's law.

As a result, light traveling in perpendicular directions, which are desired for proper light management, may freely travel between PBS cubes, in particular, between the fourth PBS cube 223 and the first PBS cube 220 and the second PBS cube 221. However, stray light, commonly not directed and may be traveling in various angles, are contained by being reflected back into their prospective PBS cubes and prevented from being accepted by the projector lens 107.

Alternatively, in one embodiment, various interfaces may be provided in the coupling areas 305–306 to contain stray light. Accordingly, materials having different optical attributes, such as, but not limited to, indices of refraction relative to the material of the PBS cube, may be utilized. For example, if the fourth PBS cube 223 is made of a material, such as, but not limited to, BK7 glass having an index of refraction of 1.5168, a glass bond of a higher index of refraction may be utilized and provided in the coupling areas 305–306, such as, but not limited to, an SF1 glass having an index of refraction of 1.7174. Alternatively, SF2 and SF57 glasses may also be utilized.

As alluded to earlier, light processed by the light management device is polarized, and as a result, birefringence may occur utilizing various interfaces. Accordingly, if dissimilar materials are utilized as previously described, coefficient of thermal expansions (CTEs) should be matched to be substantially similar between the materials. Matching CTEs aid facilitating reduction of photo elastic affects, which can cause birefringence, occurring as the environment, in which the light management device 120 & 320 is included, heats and cools during operation. Referring back to the previous example, BK7 glass has a CTE value of $8.3 \times 10^{-6}/°$ C. and SF1 glass has a CTE value of $8.8 \times 10^{-6}/°$ C. (both measured in the range of 20° C.–300° C.), thereby the CTEs of the two dissimilar materials having different indices of refraction are closely matched.

It is contemplated that in one embodiment, the above-described embodiments may be combined. For example, a light management device may combine the opaque coating, dissimilar materials with different indices of refraction, while having closely matched CTEs, and the wire-grid polarizer as described above.

Thus, it can be seen from the above descriptions, a novel method and apparatus for facilitating reduction of stray light in a reflective projection system, has been described.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. Thus, the description is to be regarded as illustrative instead of restrictive on the invention.

What is claimed is:

1. An apparatus comprising:
   a plurality of polarizing beamsplitter (PBS) cubes, with one or more subsets of which are optically coupled to each other; and
   at least one light blocking region disposed between a first and a second PBS cube of the plurality of PBS cubes.

2. The apparatus of claim 1 further comprising a wire-grid polarizer optically coupled to at least one of the plurality of PBS cubes.

3. The apparatus of claim 2, wherein the wire-grid polarizer is disposed at an angle to reflect light from the plurality of PBS cubes towards the at least one light blocking region.

4. The apparatus of claim 1, wherein the at least one light blocking region is disposed between an oblique side of the first PBS cube and an oblique side of the second PBS cube.

5. The apparatus of claim 1, wherein the light blocking region comprises a light absorbing film.

6. The apparatus of claim 5, wherein the light absorbing film is an opaque silver having a thickness of 70 nanometers.

7. The apparatus of claim 1, wherein the at least one light blocking region comprises an opaque coating.

8. The apparatus of claim 1, wherein the at least one light blocking region comprises at least a portion of a first PBS cube.

9. A light management device, comprising:
four polarizing beamsplitter (PBS) cubes optically coupled to each other in a predetermined manner to process light being provided to a projection lens, wherein at least a first and a second of the PBS cubes correspondingly having a first and a second oblique side; and
a light blocking region disposed between the corresponding first and second oblique sides of the first and the second PBS cubes to prevent stray light from being accepted by the projection lens.

10. The light management device of claim 9 further comprising a wire-grid polarizer optically coupled to at least one of the four PBS cubes.

11. The light management device of claim 10, wherein the wire-grid polarizer is disposed at an angle to reflect light from the four PBS cubes towards the light blocking region.

12. The light management device of claim 9, wherein the light blocking region comprises a light absorbing film.

13. The light management device of claim 12, wherein the light absorbing film is an opaque silver having a thickness of 70 nanometers.

14. The light management device of claim 9, wherein the light blocking region comprises an opaque coating.

15. The light management device of claim 9, wherein the light blocking region comprises at least a portion of a first PBS cube.

16. An apparatus comprising:
a plurality of polarizing beamsplitter (PBS) cubes, with one or more subsets of which are optically coupled to each other; and
at least one material with optical attribute dissimilar to optical attribute of the plurality of PBS cubes disposed between a first and a second PBS cube of the plurality of PBS cubes.

17. The apparatus of claim 16 further comprising a wire-grid polarizer optically coupled to at least one of the plurality of PBS cubes.

18. The apparatus of claim 17, wherein the wire-grid polarizer is disposed at an angle to reflect light from the plurality of PBS cubes towards the at least one of the material with dissimilar optical attribute.

19. The apparatus of claim 16, wherein the four PBS cubes are BK7 glasses.

20. The apparatus of claim 16, wherein the at least one material with dissimilar optical attribute has higher index of refraction than the plurality of PBS cubes.

21. The apparatus of claim 16, wherein the at least one material with dissimilar optical attribute is SF1 glass.

22. The apparatus of claim 16, wherein the at least one material with dissimilar optical attribute comprises at least one material with dissimilar optical attribute having a coefficient of expansion substantially similar to a material of the plurality of PBS cubes to facilitate reduction of photo elastic affects.

23. A light management device, comprising:
four polarizing beamsplitter (PBS) cubes optically coupled to each other in a predetermined manner to process light provided to a projection lens, wherein at least a first one of the four PBS cubes is separated from at least one other of the remaining PBS cubes resulting in a gap; and
a material with optical attribute dissimilar to optical attribute of the PBS cubes, disposed in the gap to prevent stray light from being accepted by the projection lens.

24. The light management device of claim 23, wherein material with dissimilar optical attribute is disposed within the gap to prevent light from traveling across the gap.

25. The light management device of claim 23, wherein the four PBS cubes are BK7 glasses.

26. The light management device of claim 23, wherein the material with dissimilar optical attribute has higher index of refraction than the four PBS cubes.

27. The light management device of claim 23, wherein the material with dissimilar optical attribute is SF1 glass.

28. The light management device of claim 23, wherein the material with dissimilar optical attribute comprises a material with dissimilar optical attribute having a coefficient of thermal expansion (CTE) substantially similar to a CTE of a material of the PBS cubes to facilitate reduction of photo elastic affects.

29. A color projection system comprising:
a light source;
a light management device optically coupled to the light source, the light management device having
a plurality of polorizing beamsplitter (PBS) cubes, with one or more subsets of which are optically coupled to each other, and
at least one light blocking region disposed between a first and a second PBS cube of the plurality of PBS cubes;
a polarizer optically coupled to the light management device;
a projection lens optically coupled to the polarizer; and
a plate, disposed between the polarizer and the projection lens, the plate having quarter-wave properties.

30. The color projection system of claim 29, wherein the polarizer comprises a wire-grid polarizer.

31. The color projection system of claim 29, wherein the at least one light blocking region is disposed between an oblique side of the first PBS cube and an oblique side of the second PBS cube.

32. The color projection system of claim 29, wherein the plate comprises a plate made of BK7 glass having a quarter-wave magnesium fluoride ($MgF_2$) to facilitate conditioning of light from the second polarizer into light having a circular polarization.

* * * * *